Dec. 26, 1967  A. N. ORMOND  3,360,255

UNIVERSAL FLEXURE UNIT

Filed June 11, 1965

INVENTOR.
ALFRED N. ORMOND
BY
*Elliott & Pastoriza*
ATTORNEYS

United States Patent Office 3,360,255
Patented Dec. 26, 1967

3,360,255
UNIVERSAL FLEXURE UNIT
Alfred N. Ormond, 11969 Rivera Road,
Santa Fe Springs, Calif. 90670
Filed June 11, 1965, Ser. No. 463,094
8 Claims. (Cl. 267—1)

ABSTRACT OF THE DISCLOSURE

This disclosure relates to a flexure joint which permits universal movement. The flexure joint includes a pair of spaced securing members and at least three flexure rods extending between and having their opposite ends secured to the spaced securing members. The flexure rods are oriented so that two of the rods are parallel and adjacent to two reference axes of a three reference axis system and are perpendicular to the third rod coincident with the third axis of the system.

---

This invention relates to flexure joints and more particularly to an improved miniature flexure joint permitting universal or omnidirectional movements.

A primary object of the present invention is to provide a universal flexure unit particularly adaptable for use with instruments such as miniature type load cells for measuring tension or compression forces of usually less than five pounds while permitting omnidirectional movements in a plane generally normal to the direction of the force being measured.

Briefly, this object is realized by providing first and second securing members for connection respectively to a force measuring instrument and a structure providing a force to be measured, together with at least three flexure rods having their opposite ends respectively secured to the first and second members. The rods are oriented such that two of the rods are parallel and adjacent to reference axes mutually perpendicular to each other and the axis of the third rod.

With the foregoing arrangement, omnidirectional flexure movements may take place in a plane generally normal to the force axis of the flexure.

A better understanding of the invention will be had by now referring to the accompanying drawings, in which.

Figure 1:
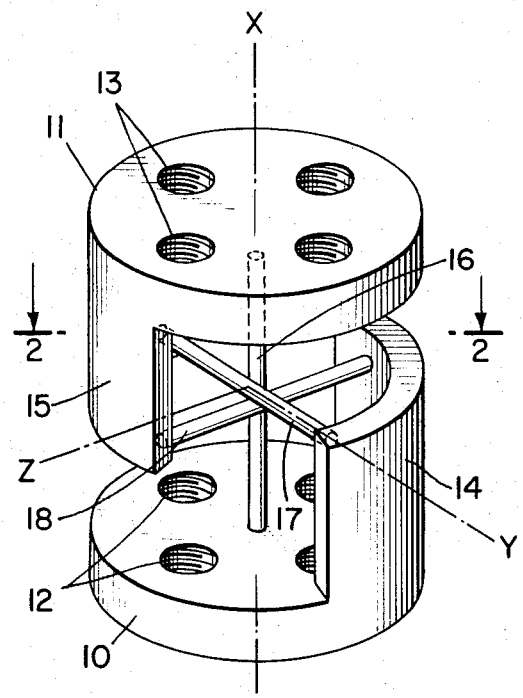
FIGURE 1 is a perspective view of a universal flexure unit in accordance with the present invention.

Referring first to FIGURE 1, the flexure unit comprises first and second securing members 10 and 11 provided respectively with threaded bores 12 and 13 to enable securement of the members to an instrument and a suitable structure between which forces are to be transmitted. In the particular flexure illustrated, the members 10 and 11 are generally of a disc shape and are oriented so that they may be conveniently designated as a base member 10 and top member 11.

The base member 10 includes an upwardly extending arm 14 preferably in the shape of a cylindrical section integrally connecting to a peripheral portion of the base. The curve of the cylindrical section is at least 90 degrees and preferably somewhat greater.

The top member 11 similarly includes a downwardly extending arm 15 in the shape of a cylindrical section also curving over an arc of at least 90 degrees and preferably greater than 90 degrees. The members 10 and 11 thus present generally an L shape and an inverted L shape, respectively, when viewed in cross-section, the members being oriented such that the free ends of the extending arms 14 and 15 overlap in opposing relationship.

A first flexure rod 16 extends vertically between the base and top 10 and 11, and has its opposite ends secured thereto as shown. A second flexure rod 17 is positioned between the free end portions of the arm sections 14 and 15 and has its opposite ends secured thereto in a horizontal position. A third flexure rod 18 similarly extends between the free end portions of the arm sections 14 and 15 and has its opposite ends secured to these arm portions.

In FIGURE 1, there is shown a reference axis system comprising first, second and third axes X, Y and Z. The X axis passes through the center of the disc-shaped members 10 and 11 and is coincident with the axis of the first flexure rod 16. The second and third axes Y and Z are mutually perpendicular to each other and to the vertical axis X. The axes of the second and third flexure rods 17 and 18 are parallel and adjacent to the reference axes Y and Z, respectively. This latter relationship is necessary in order that the flexure rods 17 and 18 may pass by each other and the flexure rod 16 without interference.

Figure 2:
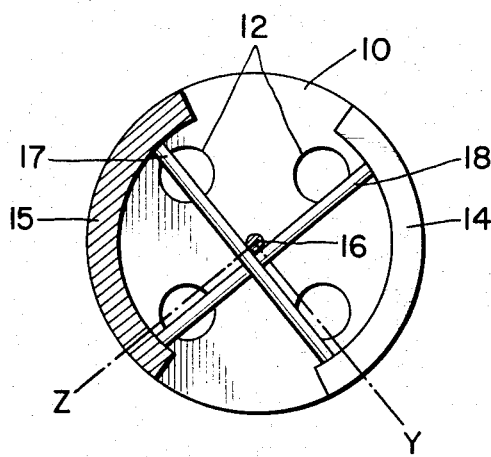
FIGURE 2 is a cross-section taken in the direction of the arrows 2—2 of FIGURE 1.

The above relationship will be better understood by reference to the cross-section of FIGURE 2 wherein it will be noted that the second and third flexure rods 17 and 18 have their axes parallel and adjacent to the second and third reference axes Y and Z.

In the operation of the flexure of FIGURE 1, it will be edivent that omnidirectional movements of the top member 11 may take place relative to the base member 10. While there is not a single point about which the flexure movements take place, the slight deviation from an exact center of movement to permit the rods to pass each other in the structure as described is not significant insofar as the flexure action is concerned in the particular applications involved.

Figure 3:
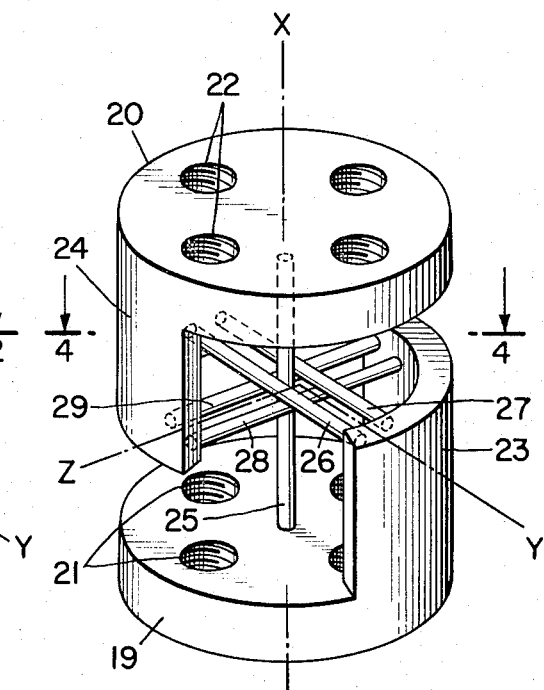
FIGURE 3 is a perspective view of a modification of the universal flexure unit of FIGURE 1; and, FIGURE 4 is a cross-section taken in the direction of the arrows 4—4 of FIGURE 3.
Figure 4:
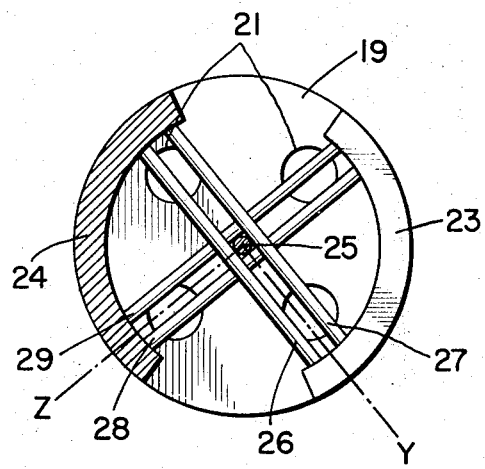

Referring now to FIGURES 3 and 4, there is shown a modification of the flexure unit of FIGURE 1 wherein there is again provided base and top members 19 and 20 of generally disc shape having suitable securing threaded bores 21 and 22, respectively, and upwardly and downwardly extending cylindrical arm sections 23 and 24. A first flexure rod 25 extends between the members 19 and 20 and has its opposite ends secured thereto. Also, there are provided a second flexure rod 26 and an additional flexure rod 27 running parallel to each other and secured between the opposite free end portions of the arm sections 23 and 24. A third flexure rod 28 and parallel additional flexure rod 29 are provided extending between the arm sections 23 and 24 with their opposite ends secured thereto as shown. The arrangement is such that the first flexure rod 25 passes between the horizontal flexure rods 26 and 27 and between the horizontal flexure rods 28 and 29, as best seen in FIGURE 4.

In the modified construction of FIGURES 3 and 4, the additional flexure rods increase the strength and stiffness of the flexure, the flexing of the pairs of horizontal rods taking place about the reference axes Z and Y, respectively. The operation is thus similar to the operation of the flexure of FIGURES 1 and 2.

Preferably, the diameter of the various flexure rods described in FIGURES 1–4 are from $\frac{1}{20}$ to $\frac{1}{5}$ the diameter of the disc members. Further, the various horizontally disposed flexure rods are all of equal length.

While the various securing members have been described in detail as constituting base and top members and the flexure rods defined as to their orientation with respect to vertical and horizontal directions, it will be clear that the entire flexure unit may be oriented in any manner, the terminalology being employed as a matter of convenience and on the assumption that the flexure is positioned upright. Accordingly, the absolute orientation of the flexure is immaterial, the significant features residing in the orientation of the flexure rods relative to each other and the securing members.

What is claimed is:

1. A universal flexure unit comprising, in combination: first and second spaced securing members; a first flexure rod having its opposite ends secured to first portions of said members respectively, said first rod lying along a first axis; a second flexure rod having its opposite ends secured to second portions of said members respectively, said second rod extending perpendicular to said first rod at a location intermediate the ends of the latter; and a third flexure rod having its opposite ends secured to third portions of said members respectively, said third rod extending perpendicular to said first and second rods at locations intermediate the ends of the latter two rods, said second and third rods being respectively parallel and adjacent to reference axes mutually perpendicular to and intersecting each other and said first axis.

2. A flexure unit according to claim 1, including additional flexure rods secured between said members in positions respectively parallel to said second and third flexure rods and defining planes therewith normal to said first axes.

3. A universal flexure unit comprising, in combination: a first securing member having a base and an upwardly extending arm section to define a general L shape in cross-section; a second securing member having a top and a downwardly extending arm section to define a general inverted L shape, said first and second members being in spaced opposing relationship to that the free ends of their respective extending arms overlap; a first flexure rod extending vertically between said members with its opposite ends secured respectively to said base and top; a second flexure rod extending horizontally between the free end portions of said upwardly and downwardly extending arms with its opposite ends secured respectively to said arms; and a third flexure rod extending horizontally between the free end portions of said upwardly and downwardly extending arms in a position substantially at right angles to said second flexure rod, the opposite ends of said third flexure rod being secured respectively to said arms at a level close to the level of said second rod, whereby omnidirectional flexure movements in horizontal directions can take place about substantially the cross-over points of said first, second, and third flexure rods.

4. A flexure unit according to claim 3, in which said base and top are of disc shape, said extending arms constituting cylindrical sections curving through circumferential distances of at least 90 degrees and integrally connected to peripheral portions of said discs respectively.

5. A flexure unit according to claim 4, including additional horizontal flexure rods secured between said arms and running parallel to and in the same horizontal planes as said second and third flexure rods respectively, said first flexure rod passing between said second rod and its coplanar additional flexure rod and passing between said third flexure rod and its coplanar additional flexure rod.

6. A flexure unit according to claim 4, in which said second and third flexure rods are equal in length and have diameters of from $\frac{1}{20}$ to $\frac{1}{5}$ the diameter of said disc shape.

7. A universal flexure unit including: first and second spaced securing members; flexure means connected to said first and second securing members for permitting relative omnidirectional movement therebetween, said flexure means comprising a first flexure rod having its opposite ends respectively secured to first portions of said members, said first rod lying along a first axis; a second flexure rod having its opposite ends respectively secured to second portions of said members and lying along a second axis; and a third flexure rod having its opposite ends respectively secured to third portions of said members and lying along a third axis, said second and third axes being respectively parallel and adjacent to reference axes mutually perpendicular to each other and said first axis.

8. A universal flexure unit according to claim 7 wherein said first, second, and third flexure rods are unstressed when no load is applied to the unit.

References Cited
UNITED STATES PATENTS

| | | | |
|---|---|---|---|
| 2,984,996 | 5/1961 | Ormond | 64—15 |
| 3,073,584 | 1/1963 | Troeger | 64—27 |
| 3,092,424 | 6/1963 | Tiplitz | 308—2 |
| 3,177,684 | 4/1965 | Bossler | 64—2 |
| 3,188,071 | 6/1965 | Owen | 64—27 |

MARTIN P. SCHWADRON, *Primary Examiner.*

PAUL E. MASLOUSKY, *Examiner.*